(12) United States Patent
Hsiao et al.

(10) Patent No.: US 9,025,104 B2
(45) Date of Patent: May 5, 2015

(54) BACKBOARD STRUCTURE, BACKLIGHT MODULE, LIQUID CRYSTAL DISPLAY MODULE

(75) Inventors: Yu-chun Hsiao, Shenzhen (CN); Yi-cheng Kuo, Shenzhen (CN); Chong Huang, Shenzhen (CN); Yajun Yu, Shenzhen (CN); Jiahe Cheng, Shenzhen (CN); Ruilian Yang, Shenzhen (CN); Gege Zhou, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 246 days.

(21) Appl. No.: 13/579,564

(22) PCT Filed: Jul. 26, 2012

(86) PCT No.: PCT/CN2012/079195
§ 371 (c)(1),
(2), (4) Date: Aug. 17, 2012

(87) PCT Pub. No.: WO2014/015499
PCT Pub. Date: Jan. 30, 2014

(65) Prior Publication Data
US 2014/0028948 A1    Jan. 30, 2014

(30) Foreign Application Priority Data
Jul. 24, 2012 (CN) .......................... 2012 1 0257727

(51) Int. Cl.
*G02F 1/1333* (2006.01)
*G02F 1/1335* (2006.01)
*F21V 8/00* (2006.01)

(52) U.S. Cl.
CPC ........ *G02F 1/133308* (2013.01); *G02B 6/0088* (2013.01); *G02F 2001/133328* (2013.01); *G02F 2201/46* (2013.01); *G02F 2001/133314* (2013.01); *G02F 2001/133317* (2013.01)

(58) Field of Classification Search
CPC .......................................... G02F 2001/133328
USPC .......................................................... 349/58
See application file for complete search history.

(56) References Cited

U.S. PATENT DOCUMENTS

2007/0229726 A1*  10/2007  Azuma et al. .................... 349/58
2010/0073959 A1*   3/2010  Hamada ......................... 362/611

* cited by examiner

*Primary Examiner* — Wen-Ying P Chen
(74) *Attorney, Agent, or Firm* — Andrew C. Cheng

(57) ABSTRACT

The present invention provides a backboard, a backlight module, and a liquid crystal display device. The backboard is configured by at least two units interconnected together, wherein the backboard includes a bottom and sidewall extending from edge of the bottom, wherein the sidewall is provided with at least a fastener which is implemented by attaching a screw onto the sidewall. The backboard is configured by two interconnected units so as to reduce the manufacturing cost. The backlight module and the liquid crystal display device are also benefited with reduced manufacturing cost. The backboard is provided with fastener implemented by attaching a screw. Accordingly, this arrangement is specially suitable for the situation in which the fasteners can not be integrally formed with the backboard. This arrangement is further beneficial for the assembling of the backlight module.

10 Claims, 4 Drawing Sheets

BACKBOARD STRUCTURE, BACKLIGHT MODULE, LIQUID CRYSTAL DISPLAY MODULE

FIELD OF THE INVENTION

The present invention relates to a technical field of display, and more particularly, to a backboard structure, a backlight module, and a liquid crystal display device.

DESCRIPTION OF PRIOR ART

A typical liquid crystal display device is generally configured with a liquid crystal display panel and a backlight module. The backlight module includes a backboard structure which is used to closely enclose the backlight module such that the components within the backlight module can be properly protected. Currently, the backboard structure is made from a sheet metal or an integrally formed plastic board. This may inevitably increase the cost of the material. In additional, as the dimension of the backboard becomes larger and larger, the pressing apparatus for the backboard becomes more and more expensive. In addition, the larger the mold, the complicate the configuration and structure, the cost is also skyrocketed. On the other hand, in order to provide an excellent heat dissipating performance, some of the metallic backboard can not be made through pressing process. Accordingly, preformed fasteners, such as a hook, can not be formed when the backboard is created. This again creates some difficulty and inconvenience during assembling.

As described, there is a necessity for providing a novel backboard, a backlight module incorporated with the novel backboard, and a liquid crystal display device, which can readily overcome the problems encountered by the prior arts.

SUMMARY OF THE INVENTION

It is the object of the present invention to provide a backboard, a backlight module, and a liquid crystal display device so as to reduce the overall cost of the backlight module and the liquid crystal display device.

In order to resolve the technical issue encountered by the prior art, the present invention introduce a technical solution by providing a backlight module including a backboard and an intermediate frame, wherein the backboard is configured by at least two units interconnected together, wherein the backboard includes a bottom and sidewall extending from edge of the bottom, wherein the sidewall is provided with at least a fastener which is implemented by attaching a screw onto the sidewall, wherein the intermediate frame is provided with a retaining slot corresponding to the fastener.

Wherein the units are interconnected by means of rivet, screw or welding

Wherein the backlight module further comprises at least a waveguide, a light source, and at least an optical film received within a space defined by the backboard and the intermediate frame, wherein the light source faces adjacent to an incident surface of the waveguide and the optical film is disposed closely to an light exiting surface, wherein the fastener is located on the sidewall adjacent to the light source.

In order to resolve the technical issue encountered by the prior art, the present invention introduce a technical solution by providing a backboard, wherein the backboard is configured by at least two units interconnected together, wherein the backboard includes a bottom and sidewall extending from edge of the bottom, wherein the sidewall is provided with at least a fastener which is implemented by attaching a screw onto the sidewall.

Wherein the unit is made from an extrusion.

Wherein the units are interconnected by means of rivet, screw or welding.

In order to resolve the technical issue encountered by the prior art, the present invention introduce a technical solution by providing a liquid crystal display device which includes a backboard which is configured by at least two units interconnected together, wherein the backboard includes a bottom and sidewall extending from edge of the bottom, wherein the sidewall is provided with at least a fastener which is implemented by attaching a screw onto the sidewall.

Wherein the unit is made from an extrusion.

Wherein the units are interconnected by means of rivet, screw or welding.

Wherein the device further includes an intermediate frame, a frontal frame, and a liquid crystal display panel arranged between a space defined by the intermediate frame and the frontal frame, a first retaining slot being defined on the intermediate frame corresponding to the fastener.

Wherein the intermediate frame includes an embossment located on outer perimeter of the first retaining slot, and the frontal frame being provided with a second retaining slot engaged with the embossment.

wherein the device further includes an intermediate frame, a frontal frame, and a liquid crystal display panel arranged between a space defined by the intermediate frame and the frontal frame, a retaining, slot being defined on the intermediate frame corresponding to the fastener, wherein the intermediate frame is sandwiched between the backboard and the frontal frame.

The present invention can be concluded with the following advantages. The backboard is configured by two interconnected units so as to reduce the manufacturing cost. The backlight module and the liquid crystal display device are also benefited with reduced manufacturing cost. The backboard is provided with fastener implemented by attaching a screw. Accordingly, this arrangement is specially suitable for the situation in which the fasteners can not be integrally formed with the backboard. This arrangement is further beneficial for the assembling of the backlight module.

DETAILED DESCRIPTION OF PREFERRED EMBODIMENTS

Detailed description will be given in view of the preferred embodiments along the accompanied drawings.

Figure 1:
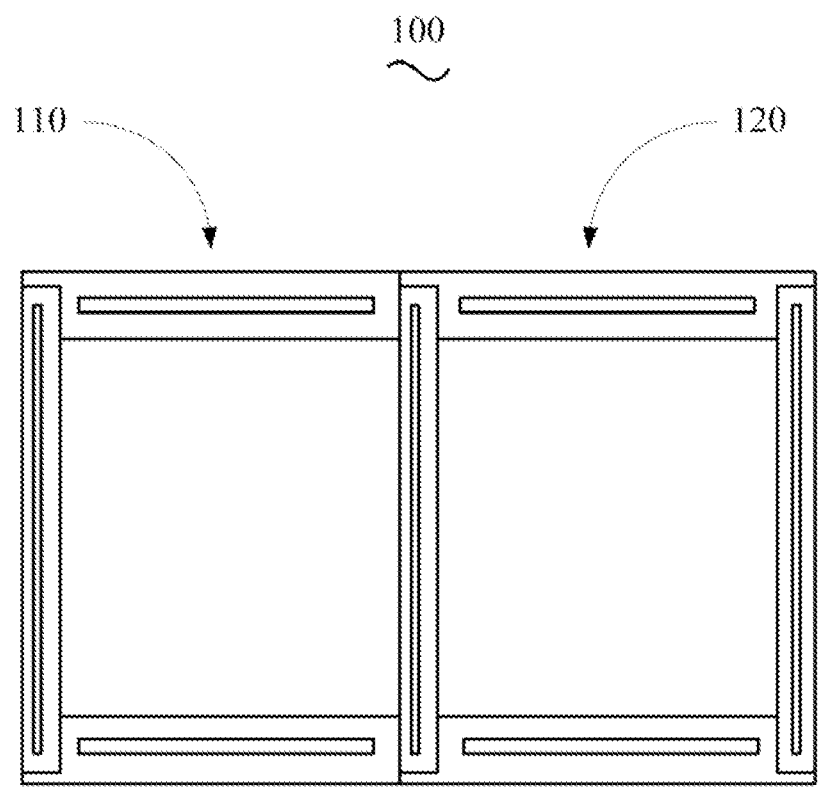
FIG. 1 is a top view of a backboard made in accordance with a preferred embodiment of the present invention.

FIG. 1 is a top view of a backboard made in accordance with a preferred embodiment of the present invention. As shown in FIG. 1, the backboard 100 includes interconnected units 110, 120.

Each of the units 110, 120 has a rectangular configuration and is interconnected together to construct the backboard 100.

In the current embodiment, the units 110, 120 are formed with extrusion, and are further interconnected by rivet, screw or welding. In other embodiment, the backboard 100 can be configured by more than two units 110, 120 depending on the design and dimension of the backlight module.

Figure 2:
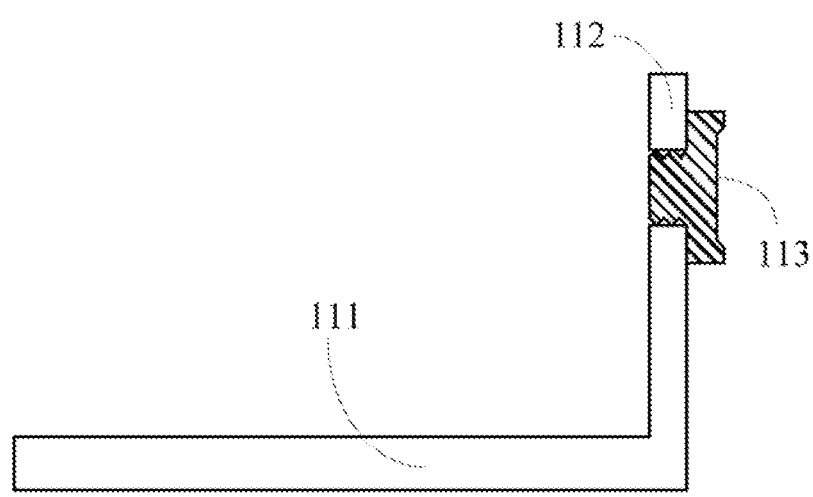
FIG. 2 is a cross sectional view of a unit used to construct a backboard in the present invention.

FIG. 2 is a cross sectional view of a unit used to construct a backboard in the present invention. As shown in FIG. 2, each of the units 110, 120 includes a bottom 111, a sidewall 112 and a fastener 113.

Wherein the sidewall 112 is bent from the bottom 111, and the Listener 113 is arranged on outside of the sidewall 112.

The bottom 111 of the units 110, 120 jointly configure the bottom 111 of the backboard 100, and the sidewall 112 of the units 110, 120 jointly configure the sidewall 112 of the backboard 100.

In the current embodiment, the fastener 113 is embodied as a screw attached to the sidewall 112. In alternative embodiment, the fastener 113 can be configured as to screw, a rivet, a bolt or any equivalent thereof.

In this embodiment, the sidewall 112 of the backboard 100 is made from aluminum extrusion, and the sidewall 112 is arranged to a light source (not shown in Figure) of a backlight module. Accordingly, the sidewall 112 can be a part of the backboard 100 to support the bottom 111 of the backboard 100. Furthermore, since the aluminum extrusion has excellent heat dissipating performance, accordingly, the sidewall 112 of the backboard 100 can serve as a heatsink of the backlight module fir facilitating heat dissipation for the light source. In other alternative embodiment, the sidewall 112 of the backboard 100 can be made from aluminum sheet or other sheet metal having excellent heat dissipation performance.

Figure 3:
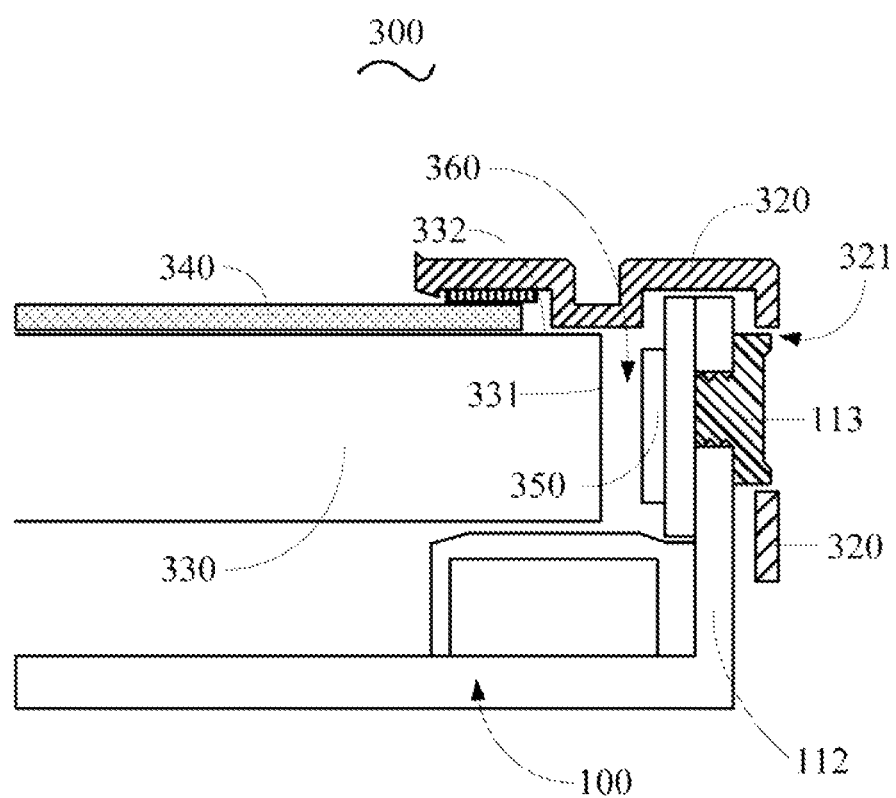
FIG. 3 is a cross sectional and illustrational view of a backlight module made in accordance with the present invention.

FIG. 3 is a cross sectional and illustrational view of a backlight module made in accordance with the present invention. As shown in FIG. 3, the backlight module 300 includes a backboard 100, an intermediate frame 320, a waveguide 330, at least an optical film 340, and a light source 350. The waveguide 330, the light source 350, and the optical films 340 are disposed within a space 360 defined in the backboard 100 and the intermediate frame 320.

In the current embodiment, the waveguide 330 includes an incident surface 331, and a light emitting surface 332 which is perpendicular to the incident surface 331. The light source 350 is arranged adjacent to the incident surface 331, and the optical film 340 is arranged closely to the light emitting surface 332. The intermediate frame 320 is defined with a retaining slot 321 interengageable with the retainer 113 of the backboard 100. The fastener 113 is arranged closely to the sidewall 112 adjacent to the light source 350.

In the current embodiment, the sidewall 112 of the backboard 100 is made from aluminum extrusion. As a result, the sidewall 112 can be a part of the backboard 100 to support the bottom 111 of the backboard 100, and it can also serve as a heatsink for the backlight module 300 to dissipate heat generate from the light source 350.

Figure 4:
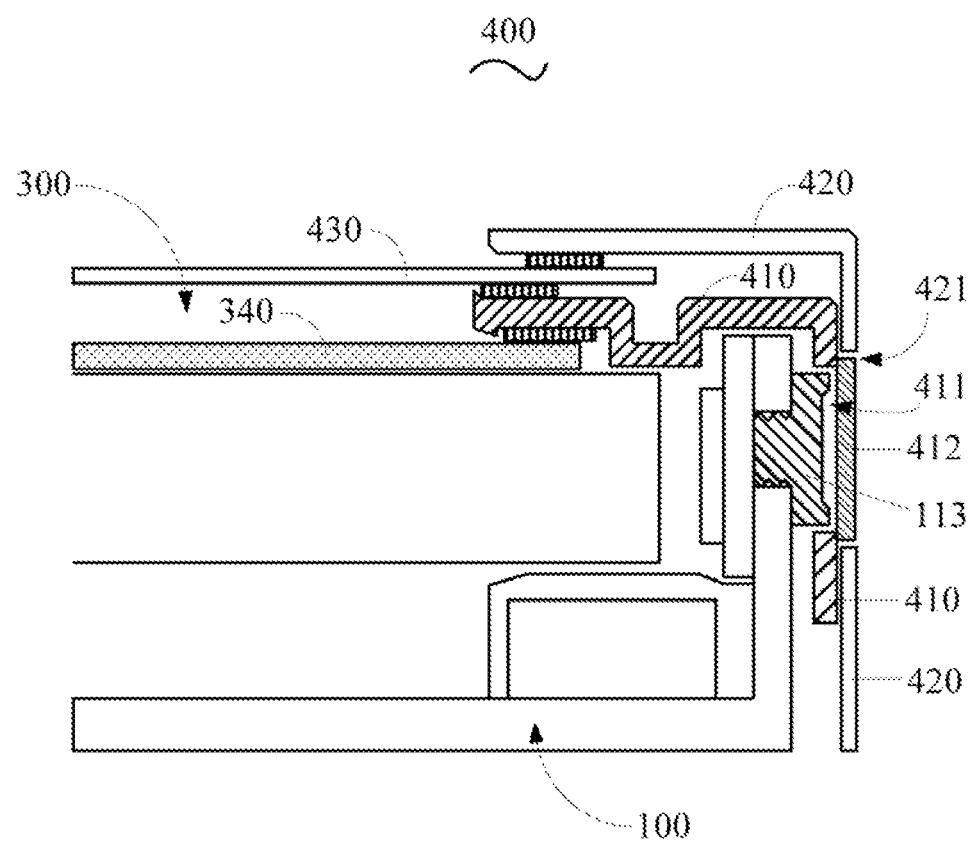
FIG. 4 is a partial, cross sectional and illustrational view of a liquid crystal display device made in accordance with the present invention.

FIG. 4 is a partial, cross sectional and illustrational view of a liquid crystal display device made in accordance with the present invention. As shown in FIG. 4, the liquid crystal display device 400 generally includes a backboard 100, an intermediate frame 410, a frontal frame 420, and a liquid crystal display panel 430.

The liquid crystal display panel 430 is arranged in a space defined between the intermediate frame 410 and the frontal frame 420, and are closely arranged with the optical film 340 of the backlight module 300.

In the current embodiment, the intermediate frame 410 is defined, with a first retaining slot 411 and an embossment 412. The first retaining slot 411 is used to engage with the fastener 113 of the backboard 100. By this arrangement, the intermediate frame 410 is properly assembled to the backboard 100. The embossment 412 is arranged on the outer skirt of the first retaining slot 411. The frontal frame 420 is defined with a second retaining slot 421 which can engage with the second retaining slot 421 such that the backlight module 300 can be readily assembled to the frontal frame 420.

Figure 5:
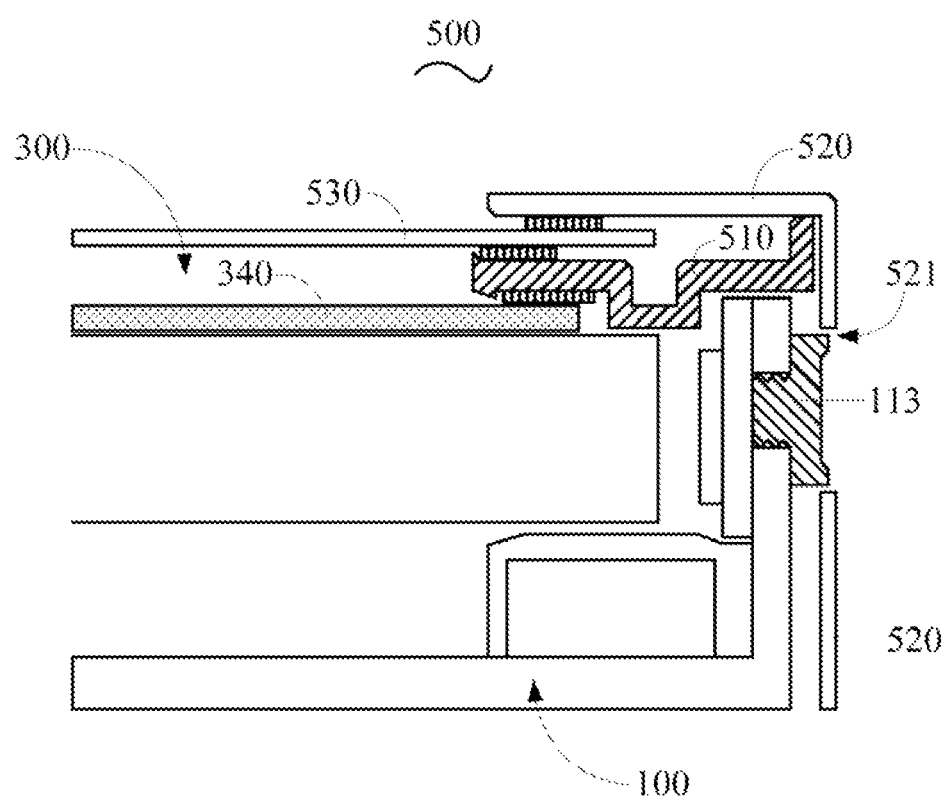
FIG. 5 is a cross sectional and illustrational view of a liquid crystal display device made in accordance with another embodiment of the present invention.

FIG. 5 is a cross sectional and illustrational view of a liquid crystal display device made in accordance with another embodiment of the present invention. As shown in FIG. 5, in the current embodiment, the liquid crystal display device 500 includes a backboard 100, an intermediate frame 510, a frontal frame 520, and a liquid crystal display panel 530.

Wherein the liquid crystal display panel 530 is arranged between a receiving space defined by the intermediate frame 510 and the frontal frame 520, and is closely juxtaposed with the optical film 340 of the backlight module 300.

The difference between the embodiments shown in FIGS. 4 and 5 is that the frontal frame 520 is defined with a retaining slot 521 which directly engages with the fastener 113 of the backboard 100. Accordingly, the backlight module 300 is properly assembled to the front frame 520. Meantime, the intermediate frame 510 is tightly retained between the backboard 100 and the frontal frame 520.

In conclusion, the backboard is configured by two interconnected units so as to reduce the manufacturing cost. The backlight module and the liquid crystal display device are also benefited with reduced manufacturing cost. The backboard is provided with fastener implemented by attaching a screw. Accordingly, this arrangement is specially suitable for the situation in which the fasteners can not be integrally formed with the backboard. This arrangement is further beneficial for the assembling of the backlight module.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. A backlight module including a backboard and an intermediate frame, wherein the backboard is configured by at least two units interconnected together, wherein the backboard includes a bottom and sidewall extending from edge of the bottom, wherein the sidewall is provided with at least a fastener which is implemented by attaching a screw onto the sidewall, wherein the intermediate frame is provided with a first retaining slot corresponding to the fastener; and wherein the intermediate frame includes an embossment located on outer perimeter of the first retaining slot, and further provided with a frontal frame having a second retaining slot engaged with the embossment.

2. The backlight module as recited in claim 1, wherein the units are interconnected by means of rivet, screw or welding.

3. The backlight module as recited in claim 1, wherein the backlight module further comprises at least a waveguide, a light source, and at least an optical film received within a space defined by the backboard and the intermediate frame, wherein the light source faces adjacent to an incident surface of the waveguide and the optical film is disposed closely to an light exiting surface, wherein the fastener is located on the sidewall adjacent to the light source.

4. A backboard, wherein the backboard is configured by at least two units interconnected together, wherein the backboard includes a bottom and sidewall extending from edge of the bottom, wherein the sidewall is provided with at least a fastener which is implemented by attaching a screw onto the sidewall, wherein an intermediate frame is provided with a first retaining slot corresponding to the fastener; and wherein the intermediate frame includes an embossment located on outer perimeter of the first retaining slot, and further provided with a frontal frame having a second retaining slot engaged with the embossment.

5. The backboard as recited in claim 4, wherein the unit is made from an extrusion.

6. The backboard as recited in claim 4, wherein the units are interconnected by means of rivet, screw or welding.

7. A liquid crystal display device, including a backboard which is configured by at least two units interconnected together, wherein the backboard includes a bottom and sidewall extending from edge of the bottom, wherein the sidewall is provided with at least a fastener which is implemented by attaching a screw onto the sidewall;

wherein the device further includes an intermediate frame, a frontal frame, and a liquid crystal display panel arranged between a space defined by the intermediate frame and the frontal frame, a first retaining slot being defined on the intermediate frame corresponding to the fastener; and wherein the intermediate frame includes an embossment located on outer perimeter of the first retaining slot, and the frontal frame being provided with a second retaining slot engaged with the embossment.

8. The liquid crystal display device as recited in claim 7, wherein the unit is made from an extrusion.

9. The liquid crystal display device as recited in claim 7, wherein the units are interconnected by means of rivet, screw or welding.

10. The liquid crystal display device as recited in claim 7, wherein the intermediate frame is sandwiched between the backboard and the frontal frame.

\* \* \* \* \*